United States Patent Office 3,629,347
Patented Dec. 21, 1971

3,629,347
CYCLOCO-OLIGOMERIZATION TO FORM MULTI-CYCLIC OLEFINIC RINGS
Gunther Wilke and Paul Heimbach, Mulheim (Ruhr), Germany, assignors to Studiengesellschaft Kohle m.b.H., Mulheim (Ruhr), Germany
No Drawing. Continuation-in-part of abandoned applications, Ser. No. 532,900, Mar. 9, 1966, Ser. No. 76,520, Dec. 19, 1960, Ser. No. 203,753, June 20, 1962, and Ser. No. 582,775, Sept. 27, 1966. This application July 29, 1969, Ser. No. 845,901
Claims priority, application Germany, Sept. 29, 1965, St 24,439
Int. Cl. C07c 3/10
U.S. Cl. 260—666     6 Claims

ABSTRACT OF THE DISCLOSURE

Process of cycloco-oligomerization of a conjugated diolefin, such as butadiene or a substituted butadiene, with a different cyclic unsaturated hydrocarbon, which is an acetylene and/or a non-conjugated olefin, preferably a monoolefin, to produce multicyclic products having olefinic unsaturation in at least one of the rings. These products are made by reacting the above-mentioned reactants together in contact with a carbonyl-free, 0-valent nickel compound catalyst. Many of the new products formed by this process are described, characterized and claimed.

---

This application is a continuation-in-part of application Ser. No. 532,900, filed Mar. 9, 1966; application Ser. No. 76,520, filed Dec. 19, 1960, now abandoned; application Ser. No. 203,753, filed June 20, 1962, now abandoned; and application Ser. No. 582,775, filed Sept. 27, 1966, now abandoned.

In these parent applications, a process has been described for the catalytic dimerization and trimerization, respectively, of 1,3-diolefins, in which catalysts are used which are produced by mixing carbonyl-free compounds of nickel with organometallic compounds such as metal alkyls, metal aryls, or Grignard compounds, or with metal hydrides or with metal hydride complex compounds and electron donors. The electron donors used are Lewis bases such as cyclic ethers, tertiary amines, especially cyclic tertiary amines, alkyl or aryl phosphines, especially triphenylphosphine, or alkyl or aryl phosphites or compounds with a carbon-to-carbon multiple bond. Similar processes are claimed in German Auslegeschrift 1,126,864 of Badische Anilin- und Sodafabrik, wherein the catalysts are made by the reduction of transitional metal compounds by means of metals (Al, Mg), and German Auslegeschrift 1,144,268, wherein certain nickel-(0) compounds are used as catalysts. Furthermore, it is known that butadiene can be transformed with the aid of catalysts, such as $(R_3P)_2Ni(CO)_2$, into mixtures of cyclo-octadiene-(1,5) and 4-vinylcyclohexene by the methods described in German Pat. 881,511 and U.S. Pat. 2,686,209.

According to Austrian Pat. 232,495, the catalytic co-oligomerization of butadiene and ethylene, for example, results in the formation of cyclodecadiene-(1,5) compounds. According to all the processes described in the above-cited patents, substituted 1,3-diolefins can be used instead of butadiene-(1,3).

In the general further development of cyclo-co-oligomerization, it has surprisingly been found that unsaturated multicyclic large rings can be produced by the cyclo-co-oligomerization of at least one conjugated diene and at least one cyclic non-benzenoid unsaturated compound which is not a conjugated diene in the presence of a known catalyst. This catalyst is a carbonyl-free, zero valent nickel compound.

The cyclo-co-oligomerization of this invention can be performed with the aid of catalysts of zerovalent nickel such as those described in German Auslegeschrift 1,140,569 and in Austrian Pat. 232,495. These catalysts are especially well suited to use in the cyclo-co-oligomerization of this invention, since with these catalysts isomerizations of the types which have been observed to a certain extent in the case, for example, of catalysts prepared by means of alkali metals according to German Auslegeschrift 1,126,864 do not occur. The carbonyl free zerovalent nickel catalysts used in this invention have the additional advantage in the cyclo-co-oligomerization process thereof in that they are catalytically active at lower temperatures than, for example, the catalysts which are prepared according to German Auslegeschrift 1,144,268. The complex compounds of zerovalent nickel described in German Auslegeschrift 1,191,375 can also be used as catalysts. In all cases in which substituted conjugated diene starting materials are used, the substituents themselves can be hydrocarbons or functional groups (e.g., alkoxy or carboxylic acid ester groups). They may also be hydrocarbons which contain such functional groups. The only functional groups involved are those which do not enter into any reactions with the catalysts, with the conjugated diene or other reactants or with the unsaturated multicyclic products under the cyclo-co-oligomerization reaction conditions hereof.

The process according to the invention can be performed in the presence of inert solvents. But only those solvents which attack neither the reactants nor the products, nor the catalysts, nor the organometallic components, nor the metal hydrides which were used for the manufacture of the catalyst are suitable. Aliphatic or aromatic hydrocarbons, or aliphatic or cycloaliphatic ethers are used preferentially. It is particularly advantageous, however, to use the starting conjugated diolefins or the products that can be made according to the process of this invention as solvents in the manufacture of the catalyst, so that a minimum of foreign substances will have to be separated from the reaction product. The process of this invention can be performed at normal pressure or at elevated pressure. The pressure range in that case is determined by the desired direction of the reaction and by the temperature that is needed in each case. The process can be performed at temperatures from −10 to 200° C., but preferably at 20 to 120° C.

Multicyclic, unsaturated, hydrocarbon alicyclic rings can be produced according to the process of this invention in high yields with reference to the non-conjugated diene reactant. The compounds that can be manufactured according to the invention are valuable starting products for further syntheses. They can themselves be further cyclo-co-oligomerized to higher molecular weight compounds which are resinous in nature and are therefore suited to use as molding materials. They can be hydrogenated to saturated compounds and as such used as solvents. They can be oxidatively cleaved at one or more unsaturated sites to form aldehydes, alcohols or acids which are themselves useful in a manner and for applications known to be attributed to such functional groups.

Through the co-oligomerization of cyclic acetylenes with butadiene, 4,5 - polymethylene-cyclodecatrienes- (1,4,7) can be produced in yields of more than 95 percent of the reacted cycloalkine:

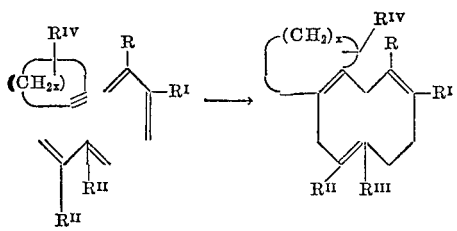

wherein R, R$^I$, R$^{II}$, R$^{III}$ and R$^{IV}$ are each hydrogen or a substantially inert substituent such as an alkyl group, e.g. a lower alkyl group of up to about 8 carbon atoms, an aryl group, e.g. a mono or dicyclic phenyl or substituted phenyl moiety having up to about 16 carbon atoms, an alkoxy or aryloxy group or possibly one or more halo groups alone or on an alkyl, alkoxy or aryloxy group.

In an entirely analogous manner, one or more olefinically unsaturated rings (where the olefinic unsaturation is not of the conjugated diene type) cyclo-co-oligomerize with butadiene or a substituted butadiene to form an unsaturated multicyclic product.

In accord with the practice of this invention the conjugated diene reactant or reactants are cyclo-co-oligomerized with one or more cyclic non-benzenoid unsaturated compounds as olefins which are not conjugated dienes or as acetylenes in a reactant mole ratio such that there is preferably one mole of cyclic reactant to two moles of conjugated diene reactant. While these mole ratios are preferred, it will be clear to one skilled in this are that reactant proportions as low as 10 mole percent of one type of reactant to 90 mole percent of the other type of reactant are suited to use in this invention. Where more than one representative of either type of reactant is used, the individual compounds may be present in mole ratios of about 1:10 to 10:1 with respect to each other where these are two reactants of one group. Where these are more than two reactants of a given group, each reactant should represent at least 10 mole percent of its entire group. It is preferred that one conjugated diene react with one cyclic unsaturate in the above recited mole ratio of about 2:1 respectively.

The compounds occurring as by-products, such as cyclooctadiene-(1,5), cyclodecadiene-(1,5) and cyclododecatriene-(1,5,9), are valuable starting substances for prior-art technical processes.

Further, these oxidatively cleaved products, long-chain acids, aldehydes and/or alcohols, have known utility in the plasticizer and detergent arts.

EXAMPLE I

The catalyst was prepared by reducing 4.34 g.=17.05 mmoles of nickel acetyl acetate and 9.19 g.=17.05 mmoles of tri-(o-phenyl phenyl)-phosphite in 85 cc. of benzene, in which about 10 g. of butadiene are dissolved, with 4.43 g.=34.1 mmoles of monoethoxydiethyl aluminum at 0 to 20° C.

This catalyst solution was heated together with 114 g. of cyclododecine to 40° C., and then for 20 hours, about 30 g. of butadiene per hour were fed in. Thereafter all volatile components of the reaction mixture were distilled out at 10$^{-4}$ torr and up to 40° C. The distillation residue, which contained the catalyst in addition to the higher-boiling hydrocarbon product, was dissolved in 300 ml. of pentane. The catalyst was destroyed by treatment with 2 N HCl and excess air. The product of catalyst destruction, tri-(o-phenyl phenyl) phosphite, is substantially insoluble in pentane and was removed from the pentane solution by suction filtration. The resultant solution was cooled and concentrated to yield:

11.6 g.=1.6% 4-vinylcyclohexane
569.4 g.=78.8% cyclooctadiene-(1,5)
9.9 g.=1.4% unknown C$_{10}$ to C$_{20}$ range compounds
122.1 g.=17.0% bi-cyclo-(10,8,0)-eicosatriene-cis, cis, trans-$\Delta^{1,10}$, 3,7)
9.0 g.=1.2% higher oligomers The yield of the novel bicycloeicosatriene, referred to the reacted cyclododecine (68% reacted), was 94% of theoretical.

The bicycloeicosatriene was characterized by infrared, Raman, and by $^1$H-nuclear magnetic resonance spectra and by chemical reactions. Partial hydrogenation over platinum in glacial acetic acid at atmospheric pressure yielded bicyclo-(10,8,0)-eicosadiene-(cis, cis, $\Delta^{1,10}$,3) having a melting point of 77.5 to 80° C. The partial hydrogenated product was 98.6 pure according to gas chromatography. Hydrogenation of the diene product over Raney nickel at 80° C. under hydrogen pressure yielded bicyclo-(10,8,0) eicosene-(cis-$\Delta^{1,10}$) having a melting point of 63.5 to 64° C. The melting point of the bicycloeicosatriene was 89 to 94° C., depending upon the rapidity of heating, because of the rearrangement thereof to a cis-divinylcyclohexene system. This rearrangement is observed in the case of all cyclodeca-(1,5)-dienes and cyclodeca-(1,4,7) trienes. At higher temperatures the rearrangement is to 3,4-divinyl-bicyclo-(10,4,0)-hexadecene-(cis-$\Delta^{1,6}$) which is partially hydrogenated to 3,4-diethyl-bicyclo-(10,4,0)-hexadecene-(cis-$\Delta^{1,6}$) which has a boiling point of 135 to 139° C. and a refraction index $n_D^{20}$ of 1.5045.

EXAMPLE II

Approximately 200 g. of butadiene are introduced per hour into the catalyst solution prepared according to Example 1, at 80 to 90° C. for a period of three hours. At the same time, approximately 70 g. of bicyclo-(2,2,1)-heptene-(2) are added drop by drop. After vacuum distillation according to Example I, 636 g. of product are obtained, having the following composition:

13.9 g.=2.2% 4-vinylcyclohexene
448.0 g.=70.4% cyclooctadiene-(1,5)
0.6 g.=0.1% cyclododecatriene-(1,5,9)
6.6 g.=1.2% two unknown hydrocarbons
119.8 g.=26.1% tricyclo-(10,2,1,0$^{2,11}$)pentadecadiene-(cis, trans-4,8)

This tricyclopentadecadiene partially isomerizes at high temperature to form cis-4,5-divinyl-tricyclo-(6,2,1,0$^{2,7}$)-undecane (B.P.$_{.20}$: 147° C., $n_D^{20}$: 1.5120). Hydrogenation with the absorption of 2 moles of hydrogen produces the corresponding cis-diethyl compound (B.P.$_{.20}$: 153° C., $n_D^{20}$: 1.4934). Upon catalytic hydrogenation over platinum in glacial acetic acid, the tricyclopentadecadiene (M.P.: 19.5 to 20° C.) yields tricyclo-(10,2,1,0$^{2,11}$)-pentadecane (B.P.$_{.20}$: 167° C., $n_D^{20}$: 1.5110).

All of the hitherto undescribed compounds were characterized by their infrared and H$^1$ NMR spectra.

The yield of tricyclo-pentadecadiene, with reference to reacted bicyclo-(2,2,1)-heptene-(2) (39 percent reaction), was 95 percent of the theory.

EXAMPLE III

The catalyst was prepared as in Example 1. 36 g.=191 mm. of cyclotetradecadine(1,8) were added to the catalyst solution and approximately 50 g. of butadiene per hour were introduced at 40° C. over about 25 hours. All of the volatiles (benzene, 4-vinylcyclohexene, cyclooctadiene-(1,5)) were removed by vacuum distillation at 0.1 torr and 20° C. Approximately 500 ml. of benzene were added to the distillation residue. The tricyclo(20,8,0$^{1,10}$0$^{16,25}$)-triacontahexaene-($\Delta^{1,10}$3,7,$\Delta^{16,26}$,18,22) (I) that was formed is practically insoluble in benzene and therefore can be removed by filtration. The catalyst was destroyed by shaking the benzene solution with 2 N aqueous HCl solution and with excess of air. After drying with calcined $Na_2SO_4$, the benzene was distilled off at reduced pressure. The residue was taken up in a little pentane, whereupon the tri-(o-phenylphenyl)-phosphate, being insoluble, is left behind. After the pentane is removed by distillation, bicyclo-(12,8,0)-eicosatriene($\Delta^{1,10}$,3,7)-ine-(16) (II) and unreacted cyclotetradecadiine are separated by fractional crystallization from an ether alcohol mixture. The following product distribution was obtained:

35.5 g.=2.7% 4-vinylcyclohexene
1218.0 g.=94.2% cyclooctadiene-(1,5)
14.8 g.=1.2% (II)
15.2 g.=1.2% (I)
10.0 g.=0.8% higher oligomers and residue.

Substances (I) and (II) were formed in a yield of 93 percent with reference to the cyclotetradecadiine that reacted (conversion=45 percent).

Substance (I) has a melting point of 160–164° C., and Substance (II) has a melting point of 98–101° C. Substances (I) and (II) have been characterized by $H^1$ NMR and infrared spectra. The partial hydrogenation of substance (I) yields tricyclo-(10,8,0,0$^{16,25}$)-triacontadiene-($\Delta^{1,10}$,$\Delta^{16,25}$), and the partial hydrogenation of substance (II) yields bicyclo-(12,8,0)-docosene-($\Delta^{1,10}$).

What is claimed is:
1. Process of cyclocooligomerization of a conjugated diene reactant and a cyclic compound containing non-benzenoid unsaturation in the ring which is not itself a conjugated diene which process comprises contacting and reacting said conjugated diene and said cyclic reactants together in a mole ratio of 1:9 to 9:1 in contact with a non-carbonyl containing, zero-valent II-bonded nickel-Lewis-base compound catalyst to produce a multicyclic aliphatic unsaturated product.

2. Process claimed in claim 1 wherein said conjugated diene and said cyclic reactant are present in mole ratio of about 2:1 respectively.

3. A process as claimed in claim 1, wherein said conjugated dienes are selected from the group consisting of butadiene, isoprene, piperylene, 2,3-dimethyl butadiene, 5-methyl-heptatriene-1,3,6, phenyl butadiene, methoxybutadiene, ethyl-butadiene, n-octatriene-1,3,6 and ethyl sorbate.

4. A process as claimed in claim 1, carried out in a solvent at a temperature of about −10 to 200° C.

5. A process as claimed in claim 4, carried out at about 20 to 120° C.

6. A process as claimed in claim 1, wherein said cyclic reactant is at least one member selected from the group consisting of cyclododecine, bicyclo-(2,2,1) heptene-(2) and cyclotetradecadiine.

References Cited

UNITED STATES PATENTS

| | | | |
|---|---|---|---|
| 3,271,468 | 9/1966 | Wilke et al. | 260—666 B |
| 3,238,265 | 3/1966 | Mueller | 260—666 B |
| 2,951,881 | 9/1960 | Reppe et al. | 260—666 A |
| 3,417,130 | 12/1968 | Pruett | 260—666 B |

DELBERT E. GANTZ, Primary Examiner

V. O'KEEFE, Assistant Examiner

U.S. Cl. X.R.

260—468, 668